Patented June 24, 1924.
1,498,820
UNITED STATES PATENT OFFICE.
CARL E. TAYLOR, OF WHITEFIELD, NEW HAMPSHIRE.
PULLEY ATTACHMENT.
Application filed May 5, 1922. Serial No. 558,801.
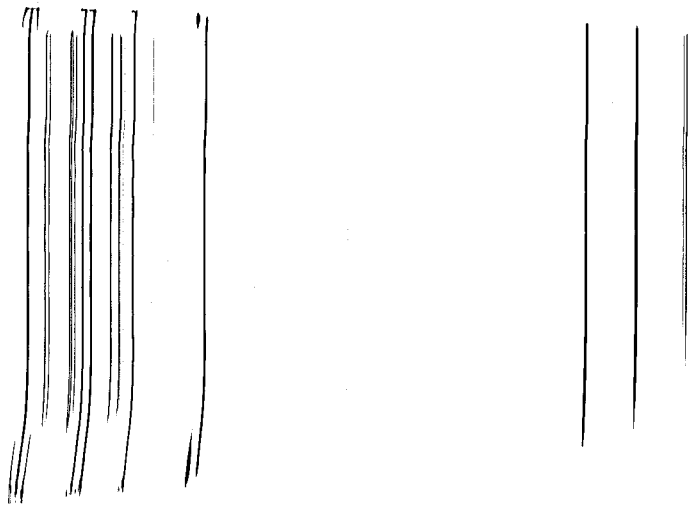

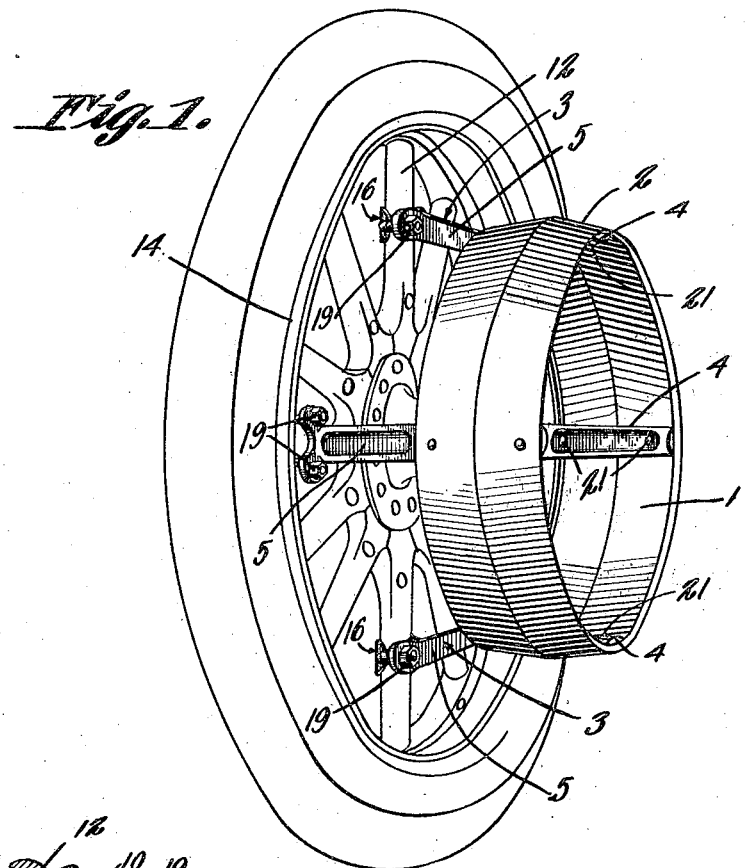
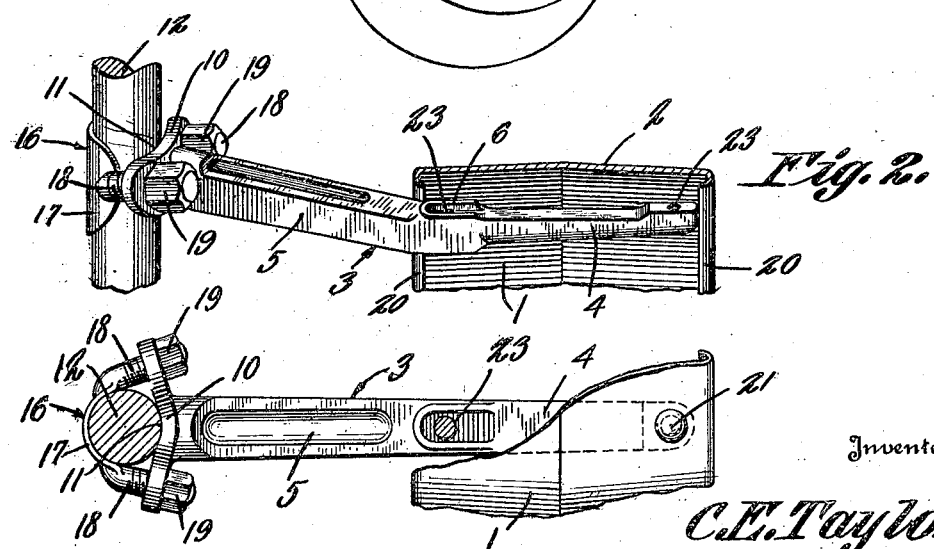

shaped to conform to the spoke 12, the U-bolt including arms 18 passing through the foot 10 of the arm 3. Nuts 19 are threaded on the arms 18 of the U-bolt 16, and, when the nuts are tightened, the spoke 12 will be bound firmly between the bend 17 of the U-bolt and the foot 10 on the arm 3, the spoke fitting in the concaved seat 11 of the foot, as depicted in Figure 3.

Owing to the fact that the parts 4 and 5 of the arm 3 are disposed at an obtuse angle to each other, the nuts 19 are disposed well beyond the periphery of the arm 2 of the pulley and are so located that a wrench or other suitable instrument may be applied to them without difficulty. The structure may be mounted quickly on the wheel of an automobile and may be detached easily therefrom when the occasion for the use of the device has passed. No alterations in the automobile wheel are necessary, and the wheel will not be marred or injured by the application thereto of the device which forms the subject matter of this application.

In practical operation, the automobile of which the wheel 14 constitutes a part is jacked up or elevated otherwise so that the wheel clears the ground. Rotation then may be imparted to the wheel 14, through the instrumentality of the engine of the vehicle, the pulley being rotated by the vehicle wheel, and motion being transmitted from the rim 2 of the pulley to a wood saw, a grinding mill, a revolving grind stone, or any other like machine commonly found upon a farm, or in a shop, barn or garage.

Having thus described the invention, what I claim as new, and desire to protect by Letters Patent of the United States is:—

In a device of the class described, a pulley comprising a rim having inwardly extended flanges, arms extended transversely of the rim, and securing devices connecting the arms with the rim, the arms having projections which engage the inner surface of the rim, the securing elements being mounted in the projections, the projections exercising a two-fold function, in that they re-inforce the arms to receive the securing element, and in that they serve to space the arms from the rim sufficiently so that the arms can clear one of the flanges.

In testimony that I claim the foregoing as my own, I have hereto affixed my signature in the presence of two witnesses.

CARL E. TAYLOR.

Witnesses:
J. C. STOUGHTON,
A. FRANCES WOOD.